US012686392B2

(12) United States Patent
  Digeser et al.

(10) Patent No.: US 12,686,392 B2
(45) Date of Patent: Jul. 21, 2026

(54) METHOD FOR MONITORING AN EGOMOTION STATE ESTIMATION OF A VEHICLE

(71) Applicant: Robert Bosch GmbH, Stuttgart (DE)

(72) Inventors: Philipp Alfons Digeser, Stuttgart (DE); Mustafa Ajanovic, Bad Liebenzell (DE); Tillmann Dueser, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 211 days.

(21) Appl. No.: 18/544,869

(22) Filed: Dec. 19, 2023

(65) Prior Publication Data
  US 2024/0217524 A1     Jul. 4, 2024

(30) Foreign Application Priority Data
  Dec. 29, 2022    (DE) ..................... 10 2022 214 432.5

(51) Int. Cl.
  *B60W 40/10*         (2012.01)
(52) U.S. Cl.
  CPC ....... *B60W 40/10* (2013.01); *B60W 2520/105* (2013.01)
(58) Field of Classification Search
  CPC ..... B60W 2520/105; B60W 2520/406; B60W 40/10; B60W 2040/1392; G05D 1/0061; G05D 1/0088; G05D 1/021; G05D 1/0214; G05D 1/0221; G05D 1/0223

USPC .......................................................... 701/93
See application file for complete search history.

(56) References Cited

U.S. PATENT DOCUMENTS

| | | | | |
|---|---|---|---|---|
| 2009/0248304 | A1* | 10/2009 | Roumeliotis | ......... H04W 4/027 701/500 |
| 2014/0032094 | A1* | 1/2014 | Heinrichs-Bartscher | .................... B60W 50/0097 701/301 |
| 2017/0299393 | A1* | 10/2017 | Steinhardt | .......... G01C 21/1654 |
| 2018/0095465 | A1* | 4/2018 | Gao | ..................... G05D 1/0257 |
| 2018/0283871 | A1* | 10/2018 | Kana | ....................... G01S 19/47 |
| 2019/0033867 | A1* | 1/2019 | Sharma | ...................... G06T 7/73 |
| 2021/0163021 | A1* | 6/2021 | Frazzoli | ............. B60W 50/023 |
| 2023/0296758 | A1* | 9/2023 | Akbarzadeh | .......... B60W 40/10 382/103 |

FOREIGN PATENT DOCUMENTS

| | | |
|---|---|---|
| DE | 102014211175 A1 | 12/2015 |
| DE | 102014218703 A1 | 3/2016 |
| DE | 102018206956 A1 | 11/2019 |
| DE | 102021104935 A1 | 9/2021 |
| DE | 102021207878 A1 | 1/2023 |

* cited by examiner

*Primary Examiner* — Erin M Piateski
*Assistant Examiner* — David Mesquiti Ovalle
(74) *Attorney, Agent, or Firm* — NORTON ROSE FULBRIGHT US LLP

(57)         ABSTRACT

A method for monitoring an egomotion state estimation of a vehicle. The egomotion state estimation is monitored on the basis of two estimated current egomotion states of the vehicle. The two egomotion states are estimated in different ways. A device, a computer program and a machine-readable storage medium, are also described.

9 Claims, 3 Drawing Sheets receive current output data of inertial measurement unit ~101 store current output data in memory ~103 receive current output data of absolute-velocity measurement sensor ~105 determine current velocity based on current output data of absolute-velocity measurement sensor ~107 estimate first current egomotion state of the vehicle ~109 estimate second current egomotion state of the vehicle ~111 monitor egomotion state estimation ~113

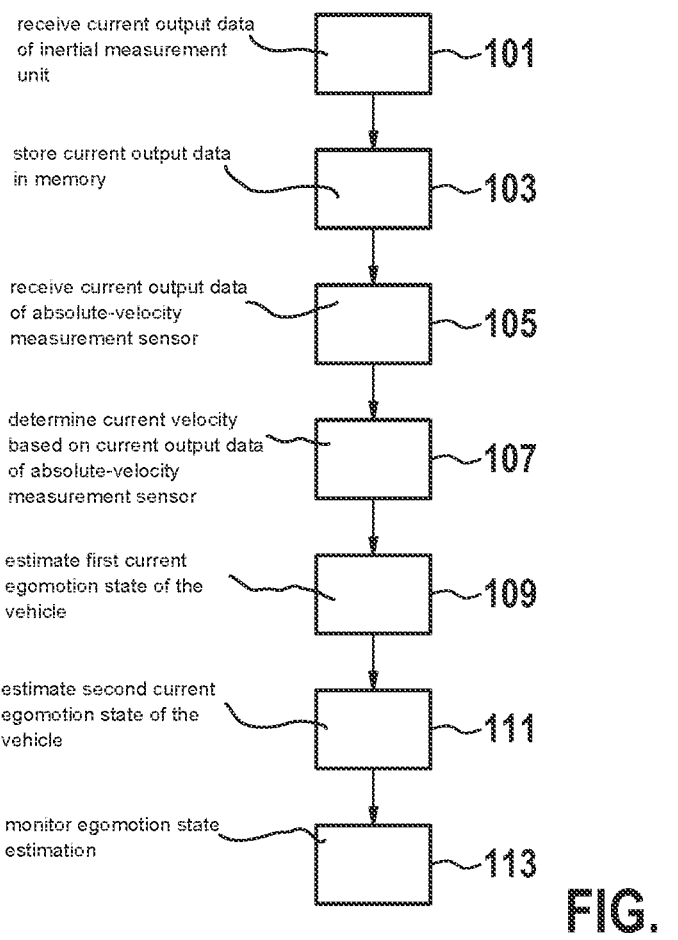

receive current output data
of inertial measurement
unit
~101 store current output data
in memory
~103 receive current output data
of absolute-velocity
measurement sensor
~105 determine current velocity
based on current output data
of absolute-velocity
measurement sensor
~107 estimate first current
egomotion state of the
vehicle
~109 estimate second current
egomotion state of the
vehicle
~111 monitor egomotion state
estimation
~113

FIG. 1

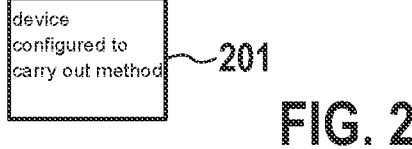

device
configured to
carry out method
~201

FIG. 2

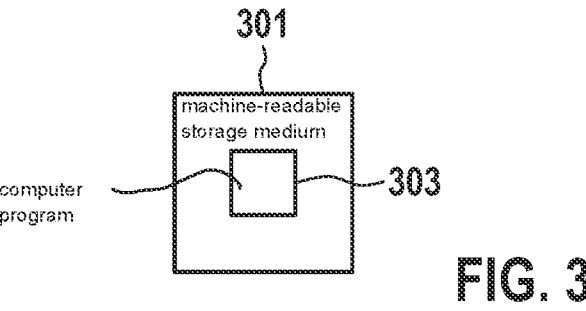

301 machine-readable
storage medium computer
program
~303

FIG. 3

METHOD FOR MONITORING AN EGOMOTION STATE ESTIMATION OF A VEHICLE

FIELD

The present invention relates to a method for monitoring an egomotion state estimation of a vehicle, a device, a computer program and a machine-readable storage medium.

BACKGROUND INFORMATION

German Patent Application No. DE 10 2014 211 175 A1 describes a method and a system for initializing a sensor fusion system.

German Patent Application No. DE 10 2018 206 956 A1 describes a method for ascertaining a vehicle position.

SUMMARY

An object of the present invention is to provide for efficiently monitoring an egomotion state estimation of a vehicle.

This object may be achieved by means of features of the present invention. Advantageous embodiments of the present invention are disclosed herein.

According to a first aspect of the present invention, a method for monitoring an egomotion state estimation of a vehicle, in particular of a motor vehicle, is provided. According to an example embodiment of the present invention, the method comprises the following steps:

Receiving current output data of an inertial measurement unit of the vehicle, the inertial measurement unit comprising at least one accelerometer and at least one gyroscopic sensor, Storing the current output data of the inertial measurement unit in a memory of the vehicle, wherein older output data of the inertial measurement unit of the vehicle are stored in the memory up to a defined past, Receiving current output data of an absolute-velocity measurement sensor, in particular of at least one wheel sensor, of the vehicle, Determining a current velocity of the vehicle on the basis of the current output data of the absolute-velocity measurement sensor of the vehicle, Estimating a first current egomotion state of the vehicle on the basis of a last estimated first egomotion state of the vehicle, the current output data of the inertial measurement unit of the vehicle and the current velocity determination, Estimating a second current egomotion state of the vehicle on the basis of a first egomotion state that is in the defined past and older than the last estimated first egomotion state, on the basis of the output data of the inertial measurement unit that are stored in the memory and are within a time period from the defined past to the current time, and on the basis of the current output data of the inertial measurement unit, Monitoring the egomotion state estimation on the basis of the estimated first current egomotion state and the estimated second current egomotion state.

According to a second aspect of the present invention, a device is provided which is configured to carry out all steps of the method according to the first aspect of the present invention. According to a third aspect of the present invention, a computer program is provided which comprises instructions which, when the computer program is executed by a computer, for example by the device according to the second aspect of the present invention, cause this computer to carry out a method according to the first aspect of the present invention.

According to a fourth aspect of the present invention, a machine-readable storage medium is provided, on which the computer program according to the fourth aspect of the present invention is stored.

According to the present invention, the above object may be achieved by monitoring the egomotion state estimation on the basis of two estimated egomotion states of the vehicle. On the one hand, a first current egomotion state of the vehicle is estimated on the basis of a last estimated first egomotion state of the vehicle, the current output data of the inertial measurement unit and the current velocity of the vehicle. On the other hand, a second egomotion state estimate is used for the monitoring, wherein this estimate is based on a first egomotion state that is in the defined past and older than the last estimated first egomotion state, on the basis of the output data of the inertial measurement unit that are stored in the memory and are within a time period from the defined past to the current time, and on the basis of the current output data of the inertial measurement unit.

That is to say, two substantially independently estimated egomotion states of the vehicle are thus present. In the ideal case, the two should match, in particular at least within a specified tolerance range. In the case of a deviation of the two estimated egomotion states, this can, for example, provide an indication of a malfunction of the inertial measurement unit or a malfunction of the absolute-velocity measurement sensor. Advantageously, the egomotion state estimation can thus be monitored efficiently.

It is noted that the egomotion states are not completely independent and depend on one another at least through the egomotion state that was ascertained at a defined time in the past. The formulation "substantially independent" was therefore used. Another formulation is "sufficiently independent."

Thus, the egomotion state estimation can, for example, be monitored efficiently without having to provide redundant inertial measurement units, which may be more cost-intensive and which may, for example, be technically more complex.

An inertial measurement unit within the meaning of the description can also be referred to as an inertial measuring unit. An inertial measurement unit can also be shortened as IMU. IMU stands for the English terms "inertial measurement unit."

The formulation "in particular of at least one wheel sensor" thus includes one or more, e.g., two, e.g., four, wheel sensors. This means, for example, that the two wheel sensors of the two wheels of the rear axle or front axle or, for example, the four wheel sensors of all four wheels both of the front axle and of the rear axle of the vehicle or, for example, the wheel sensor of a wheel of a non-driven axle of the vehicle, or the two wheel sensors of the two wheels of a non-driven axle of the vehicle are used so that the current velocity of the vehicle can be determined on the basis of the corresponding current output data of these sensors.

The vehicle is, for example, a motor vehicle.

In one example embodiment of the method of the present invention, it is provided that the current velocity determination remains disregarded for estimating the second current egomotion state of the vehicle. The current velocity determination is the result of determining a current velocity of the vehicle on the basis of the current output data of the absolute-velocity measurement sensor of the vehicle.

This, for example, results in the technical advantage that estimating the second current egomotion state of the vehicle can be carried out efficiently. According to this embodiment, it is thus provided that the current velocity determination, i.e., the current velocity of the vehicle, is not used to estimate the second current egomotion state of the vehicle.

In one example embodiment of the method of the present invention, it is provided that the first current egomotion state is estimated using an estimation method, in particular an (extended) Kalman filter and/or unscented Kalman filter and/or a particle filter, which takes into account both movement dynamics of the vehicle and a correction by means of the current output data of the absolute-velocity measurement sensor.

This, for example, results in the technical advantage that the first current egomotion state can be estimated efficiently.

The Kalman filter can, for example, be an extended Kalman filter. The Kalman filter can, for example, be an unscented Kalman filter.

In one example embodiment of the method of the present invention, it is provided that the first current egomotion state of the vehicle and/or the second current egomotion state of the vehicle are in each case estimated using an egomotion dynamics equation, in particular a strapdown algorithm.

This, for example, results in the technical advantage that the corresponding egomotion state can be estimated efficiently.

This means, for example, that the egomotion state (s) can, for example, be estimated using a strapdown algorithm.

The strapdown algorithm or the egomotion dynamics equations represented therein delivers or deliver, by means of an IMU, an estimate of the egomotion (change), with the advantage of being an environment-independent measuring principle, which is, however, subject to a drift.

The introduction of the absolute-velocity measurement sensors makes it possible to compensate for the drifts induced by the IMU, but is not independent of the environment (depending on the roadway condition, the sensor system is more or less precise).

Furthermore, these are two different sensor principles and sensors; a physically independent redundancy is therefore provided here, which is a special technical advantage.

In one embodiment of the method of the present invention, it is provided that output data of a further absolute-velocity measurement sensor, in particular of a further wheel sensor, of the vehicle are received, wherein a further current velocity of the vehicle is determined on the basis of the output data of the further absolute-velocity measurement sensor of the vehicle, wherein the first current egomotion state of the vehicle is estimated on the basis of the further current velocity determination.

This, for example, may result in a technical advantage that the first current egomotion state of the vehicle can be estimated efficiently.

In one example embodiment of the method of the present invention, it is provided that the method comprises the following steps:

Receiving current output data of a further inertial measurement unit of the vehicle, the further inertial measurement unit comprising at least one further accelerometer and at least one further gyroscopic sensor, Storing the current output data of the further inertial measurement unit of the vehicle in the memory, in which older output data of the further inertial measurement unit are stored up to the defined past, Estimating a third current egomotion state of the vehicle on the basis of a last estimated third egomotion state of the vehicle, the current output data of the further inertial measurement unit of the vehicle and the current velocity determination, Estimating a fourth current egomotion state of the vehicle on the basis of a third egomotion state that is in the defined past and older than the last estimated third egomotion state, on the basis of the output data of the further inertial measurement unit that are stored in the memory and are within a time period from the defined past to the current time, and on the basis of the current output data of the further inertial measurement unit, Monitoring the egomotion state estimation on the basis of the estimated third current egomotion state and the estimated fourth current egomotion state.

This, for example, may result in a technical advantage that the egomotion state estimation can be monitored efficiently. According to this embodiment, it is thus provided that, in addition to the two current egomotion states, further egomotion states are estimated so that more information is available for the monitoring.

In one example embodiment of the method of the present invention, it is provided that the monitoring comprises a comparison of the estimated first current egomotion state to the estimated second current egomotion state, in order to ascertain a difference between the estimated first current egomotion state and the estimated second current egomotion state.

This, for example, may result in the technical advantage that the monitoring can be performed efficiently.

In one example embodiment of the method of the present invention, it is provided that the monitoring comprises a comparison of the estimated third current egomotion state to the estimated fourth current egomotion state, in order to ascertain a further difference between the estimated third current egomotion state and the estimated fourth current egomotion state.

Furthermore, for example, the technical advantage may result that, if an error is detected due to the difference between the estimated first current egomotion state and the estimated second current egomotion state, and if no error is detected due to the difference between the estimated third current egomotion state and the estimated fourth current egomotion state, the estimated third current egomotion state and the estimated fourth current egomotion state represent a backup solution (in the sense of error tolerance) or can be used as such.

In one example embodiment of the method of the present invention, it is provided that, on the basis of the ascertained difference, an at least partially automated function, in particular a driving function, provided by means of a first vehicle system, of the vehicle is limited or wherein, on the basis of the ascertained difference, a change is made to an alternative vehicle system that can provide the same function.

This, for example, may result in a technical advantage that a safety for the vehicle can be ensured efficiently.

In one example embodiment of the method of the present invention, it is provided that the monitoring comprises a comparison of the estimated third current egomotion state to the estimated fourth current egomotion state, in order to ascertain a further difference between the estimated third current egomotion state and the estimated fourth current egomotion state, wherein, on the basis of the ascertained differences, a statement about a functional capability of the inertial measurement unit, of the further inertial measurement unit and of the absolute-velocity measurement sensor is ascertained.

This, for example, may result in a technical advantage that a statement about a functionality of the inertial measurement unit, of the further inertial measurement unit and of the absolute-velocity measurement sensor and/or of a further absolute-velocity measurement sensor, if such a sensor is used for determining a further absolute velocity for use in the method, can be ascertained or made efficiently.

Furthermore, for example, a technical advantage may result that, if an error is detected due to the difference between the estimated first current egomotion state and the estimated second current egomotion state, and if no error is detected due to the difference between the estimated third current egomotion state and the estimated fourth current egomotion state, the estimated third current egomotion state and the estimated fourth current egomotion state represent a backup solution (in the sense of error tolerance) or can be used as such.

Device features result analogously from corresponding method features, and vice versa.

The method according to the present invention is, for example, performed or carried out by means of the device.

Device features result analogously from corresponding method features, and vice versa.

The device is, for example, configured in terms of program technology to execute the computer program.

The method is, for example, a computer-implemented method.

The wording "at least one" means "one or more".

The inertial measurement unit is, for example, configured to measure the respective state variables of the six degrees of freedom of the vehicle.

Output data of an inertial measurement unit, for example, comprise the variables measured by means of the inertial measurement unit, e.g., kinematic variables, i.e., for example, accelerations and/or rotation rates or velocity increments and/or angle increments, in each case given in the three axes of a body-fixed coordinate system. The six degrees of freedom of the vehicle in three-dimensional space comprise three translations along three perpendicular axes and three rotations about three perpendicular axes, which can also be referred to as roll, pitch and yaw.

A kinematic variable within the meaning of the description is, for example, one of the following kinematic variables: location, velocity and acceleration, rotation angle and angular velocity.

Output data of an inertial measurement unit, for example, comprise measurement values of specific forces, which, in addition to the force induced by the acceleration, also measures the forces of gravitational acceleration and rotational forces. The specific force is defined as the non-gravitational force per unit mass. The specific force (also referred to as g-force or mass-specific force) is measured in meters/seconds$^2$ (m-s-2), the unit for acceleration. The specific force is thus not really a force, but a type of acceleration. However, the (mass-) specific force is not a coordinate acceleration, but an egoacceleration, i.e., the acceleration relative to free fall. Forces, specific forces and egoaccelerations are the same in all reference systems, but coordinate accelerations are frame-dependent. For free bodies, the specific force is the cause and a measure of the egoacceleration of the body. The acceleration of the g-force is identical to the specific force. The acceleration of an object that falls freely onto the earth depends on the reference frame (it disappears in the frame of free fall, also called inertial frame), but any "acceleration" as a result of the g-force is present in all frames. This specific force is equal to zero for freely falling objects, since gravity alone does not generate any g-forces or specific forces. Accelerometers on the surface of the earth measure a constant velocity of 9.8 m/s^2, even if they are not accelerated (i.e., when they do not experience any coordinate acceleration). The reason for this is that accelerometers measure the egoacceleration generated by the g-force exerted by the ground (gravity alone never generates any g-force or specific force). Accelerometers measure the specific force (egoacceleration), i.e., the acceleration relative to free fall, not the "standard" acceleration, which relates to a coordinate system.

The output data of an inertial measurement unit, for example, comprise measurement values of three rotation rate sensors (which can in particular also be referred to as gyroscopic sensors below) that in each case sense orthogonally to one another and of three acceleration sensors that in each case sense orthogonally to one another, which are, for example, comprised by the accelerometer, which sense the "specific forces."

Statements made in connection with the inertial measurement unit apply analogously to the further inertial measurement unit, and vice versa.

The output data of the inertial measurement unit can also be referred to as first output data.

The output data of the absolute-velocity measurement sensor can also be referred to as second output data.

The output data of the further inertial measurement unit can also be referred to as third output data.

The output data of the further absolute-velocity measurement sensor can also be referred to as fourth output data.

The present invention is explained in more detail below using preferred exemplary embodiments.

BRIEF DESCRIPTION OF THE DRAWINGS

FIG. 1 shows a flow chart of an example method according to the first aspect of the present invention.

FIG. 2 shows an example device according to the second aspect of the present invention.

FIG. 3 shows a machine-readable storage medium according to an example embodiment of the present invention.

DETAILED DESCRIPTION OF EXAMPLE EMBODIMENTS

In the following, the same reference signs can be used for identical features.

FIG. 1 shows a flow chart of a method for monitoring an egomotion state estimation of a vehicle, in particular of a motor vehicle, comprising the following steps:

Receiving 101 current output data of an inertial measurement unit of the vehicle, the inertial measurement unit comprising at least one accelerometer and at least one gyroscopic sensor, Storing 103 the current output data of the inertial measurement unit in a memory of the vehicle, wherein older output data of the inertial measurement unit of the vehicle are stored in the memory up to a defined past, Receiving 105 current output data of an absolute-velocity measurement sensor, in particular of at least one wheel sensor, of the vehicle, Determining 107 a current velocity of the vehicle on the basis of the current output data of the absolute-velocity measurement sensor of the vehicle, Estimating 109 a first current egomotion state of the vehicle on the basis of a last estimated first egomotion state of the vehicle, the current output data of the inertial measurement unit of the vehicle and the current velocity determination, Estimating 111 a second current egomotion state of the vehicle on the basis of a first egomotion state that is in the defined past and older than the last estimated first egomotion state, on the basis of the output data of the inertial measurement unit that are stored in the memory and are within a time period from the defined past to the current time, and on the basis of the current output data of the inertial measurement unit, Monitoring 113 the egomotion state estimation on the basis of the estimated first current egomotion state and the estimated second current egomotion state.

FIG. 2 shows a device 201 which is configured to carry out all steps of the method according to the first aspect.

FIG. 3 shows a machine-readable storage medium 301 on which a computer program 303 is stored. The computer program 303 comprises instructions that, when the computer program 303 is executed by a computer, e.g., by the device 201 of FIG. 2, cause the latter to carry out a method according to the first aspect.

Figure 4:
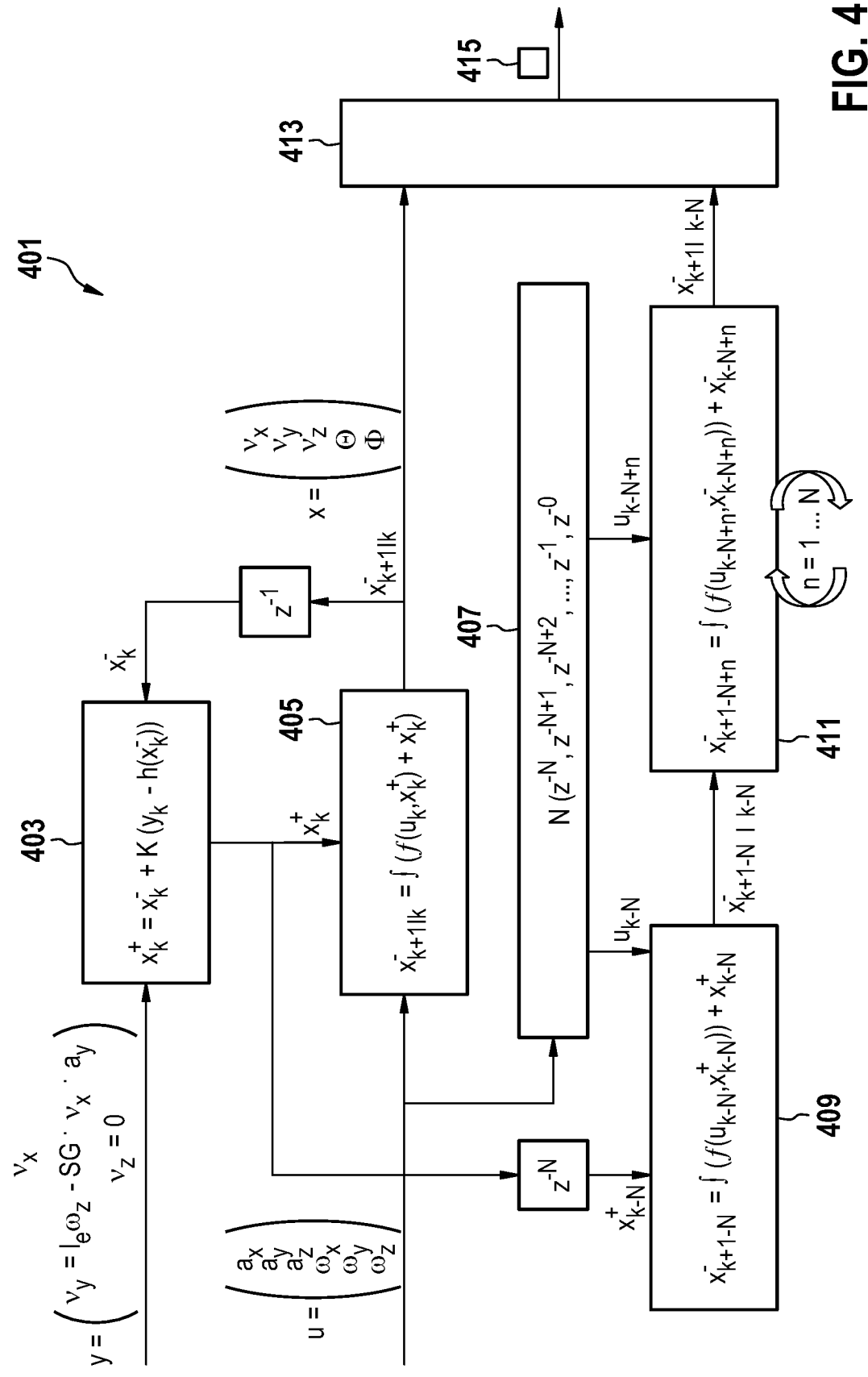
FIG. 4 shows a block diagram according to an example embodiment of the present invention.

FIG. 4 shows a block diagram 401 which is to explain herein described method by way of example using mathematical formulae.

The following apply:

vx, vy, vz: velocities of the vehicle-fixed coordinate system (vehicle).

In this equation, vx is the longitudinal velocity of the vehicle, which is measured by the absolute-velocity measurement sensor and can, for example, be ascertained directly or indirectly from the wheel velocities.

ax, ay, az: accelerations of the vehicle-fixed coordinate system (vehicle).

ωx, ωy, ωz: rotation rates of the vehicle-fixed coordinate system (vehicle).

Single-track model (second model as a "parallel implementation" for the egomotion dynamics equation, aka. strapdown): applies only (approximately) to two-axle vehicles.

le: distance between the rear axle and the vehicle center of gravity.

SG: side slip angle gradient, a characteristic variable of the single-track model.

Θ, Φ: pitch angle and roll angle.

k: k-th data sample, k+1: k+1-th data sample, k is a sample at a particular time in a time-discrete system (not time-continuous, i.e., the system only knows time steps).

n: iteration counter variable, N: maximum iteration steps/memory size.

Superscript "+": an estimated state based on a prediction AND on a correction (a posteriori), corresponding to the time k.

Superscript "−": an estimated state based only on a prediction (a priori), corresponding to the time k.

k+1|k: a (a priori/posteriori) estimated state "k+1" based on the preceding estimate "k."

z-n: a time delay/FIFO buffer with n delay steps.

u: input variables for the prediction, y: input variables for the correction.

In function block 403, a so-called correction, or "measurement update," takes place. In function block 405, a prediction and integration take place on the basis of a strapdown algorithm. Function block 407 denotes a FIFO buffer of length N. Here, "FIFO" stands for "first in first out." In function block 409, a prediction and integration are performed for n=0 on the basis of a strapdown algorithm. In function block 411, a prediction and integration are performed on the basis of a strapdown algorithm, wherein iterations take place for n=1 . . . N. In function block 413, the respectively estimated egomotion states are compared to one another, in order to ascertain a difference; the ascertained difference is symbolically denoted by a block with reference sign 415.

Figures 5, 6:
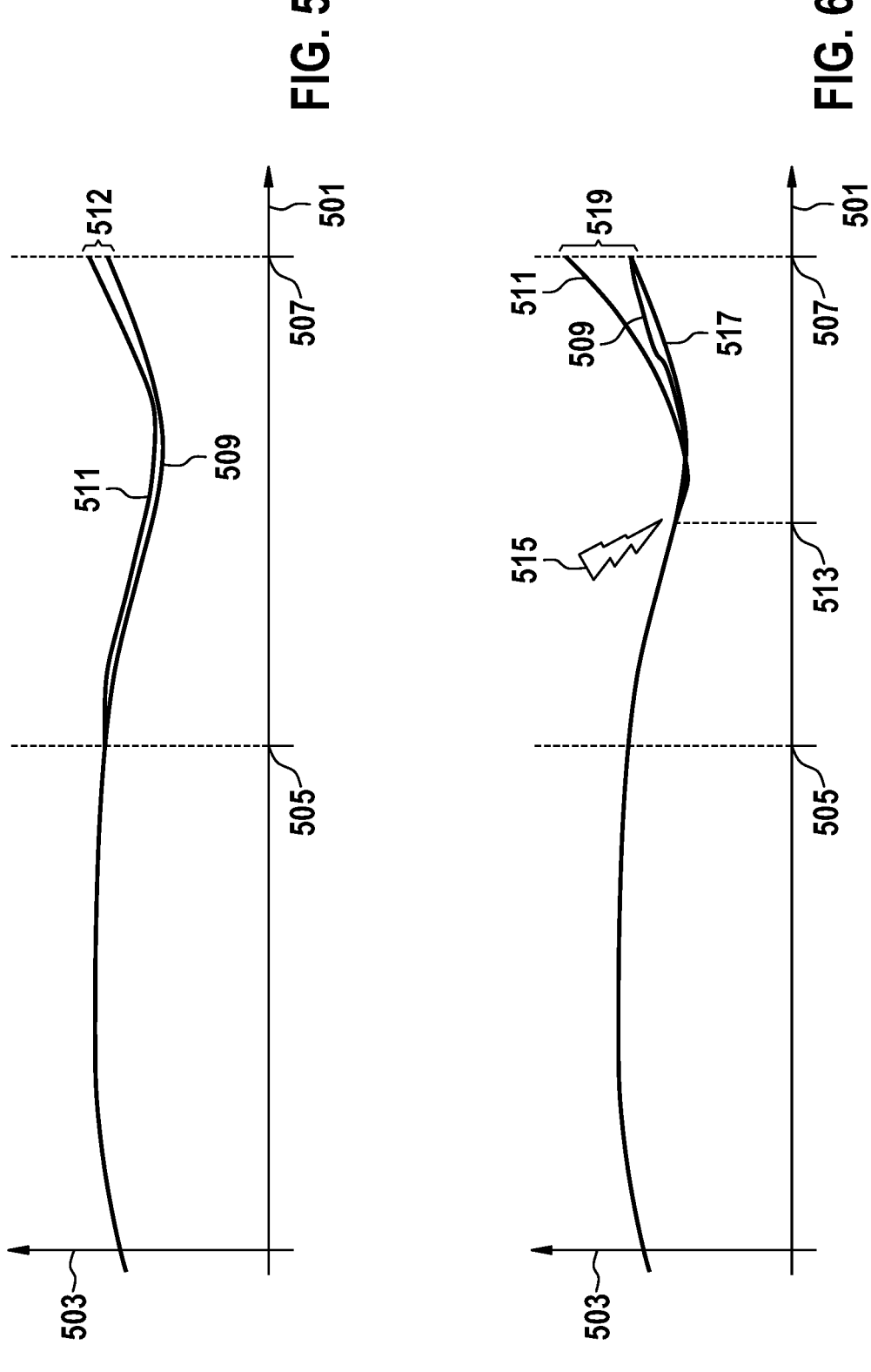
FIGS. 5 and 6 in each case show time profiles of estimated egomotion states of a vehicle, according to the present invention.

FIGS. 5 and 6 in each case show time profiles of estimated egomotion states of a vehicle. The abscissa is denoted by reference sign 501. The ordinate is denoted by reference sign 513. Reference sign 505 denotes a time t=k–N. Reference sign 507 denotes a time t=k. Reference sign 509 denotes a time profile of an estimated first egomotion state. Reference sign 511 denotes a time profile of an estimated second egomotion state.

At time t=k, a first difference 512 is present between the two estimated egomotion states and, for example, results from measurement errors of the inertial measurement unit and/or uncertainties in the Kalman filter.

FIG. 6 shows a reference sign 513, which denotes a time t=t_Fehler which is between the time 505 and the time 507. At this time 513, an error occurs in the inertial measurement unit. This occurrence of an error is symbolically denoted by an arrow symbol or flash symbol with reference sign 515.

FIG. 6 shows a further curve with reference sign 517, which represents the estimated first egomotion state, e.g., the estimated longitudinal velocity, in the no-error case, which state is estimated by the Kalman filter. It is noted that this signal variable does not exist in this context, but is shown only for simpler comparison with FIG. 5. The curve with reference sign 509 thus represents the state ascertained in the same way, but in the case of an error: an error of the IMU which leads to incorrect rotation rates and/or accelerations. Here, the error is not very noticeable, since two models for velocity estimation are implemented in the Kalman filter (prediction with egomotion dynamics equation, which is based on the IMU, and correction with single-track model, wherein the latter acts dominantly in this configuration). The curve with reference sign 511 represents the estimation based only on the egomotion dynamics equation. Since its sole input signals (IMU) are incorrect, the state drifts and a difference 519 between the curves 511 and 509 builds at time t=k, which difference is, for example, ultimately monitored by a further algorithm, which may comprise that an error is detected in the case of an excessively large difference 519, i.e., in the case of a difference 519 that is greater than, or greater than or equal to, a predetermined difference threshold value.

In summary, the concept described here in particular comprises a Kalman filter-based state estimation, wherein other state estimators with model redundancy can however also be used.

The state estimator used as a reference for the first egomotion state comprises a typical Kalman filter implementation of a prediction or estimation, and a correction using the output data of the absolute-velocity measurement sensor, e.g., of the wheel sensor, wherein the estimation, for example, delivers a model-based estimate of the states x:

$x-k+1|_k$ represents the predicted state (marked by "−"=predicted, which is often also referred to as "a priori") of the sample k+1. The prediction here is based on the sample k. In other words: A sample k of the state x was used to predict a new state k+1.

In the next cycle, the predicted state k+1 is corrected by a measurement update so that the predicted state "−" is converted to a corrected state "+," which is often also referred to as "a posteriori" in the literature, =x+k.

The preset algorithm, for example, corresponds to the common concept of a Kalman filter. In addition, further relationships are required, which are however not to be presented here (and are also no longer relevant). This step is performed in order to correct the "inaccurate" prediction by means of measurements made by sensors (e.g., wheel velocities).

A further detail, which is important for understanding, is the fact that the Kalman filter is optimized by means of variances for the process noise and the measurement noise, wherein the process noise defines how strongly the prediction is weighted. The measurement noise defines how strongly the measurement is weighted (weighting=influence on the estimated variables).

So that the first current egomotion state depends little on the output data output by the IMU and is strongly coupled to the measured velocity, the process noise and measurement noise are, for example, configured such that the measured velocity dominates (and a difference from a faulty IMU thus builds faster and more strongly).

For example, models that are sufficiently independent of the models in the prediction (system description with strapdown) are used in the measurement equation. For example, two different model assumptions are in this case fused.

The state estimator used as a reference is, for example, extended by a further prediction, which is, for example, based on a sample k−N provided by the measurement update, for example (if k represents the current sample, the sample k−N is N samples in the past).

In order to now predict the sample k+1, the prediction is, for example, calculated N times with the samples u (which as input for the system description of the prediction=strapdown integration) for the respective time step k−N+n, wherein n represents a control variable from n=0 (sample at time k−N) to n=N (sample at time k). The calculated solution is represented as $$x_{k+1|k-N}^-$$

i.e., the states are predicted states ("−") at time k+1, which are based on states at time k−N.

This algorithm, which now runs in addition to the first state estimation, in particular in parallel, and is carried out for each sample k, comprises, for example, that the prediction only works with the system model of the strapdown algorithm, which in the ideal case (=error-free case) is however largely identical to the measurement model according to the first egomotion state estimation or to the fused models (measurement model of the measurement update and system model of the strapdown integration), i.e., is largely identical to the first egomotion estimation, in which the measurement model of the prediction dominates the estimation of the states and the strapdown algorithm of the prediction contributes a small contribution to the ascertainment of the states.

If an error-related behavior of the inertial measurement unit now occurs (wherein the definition of "error" comprises both systematic and random errors), the integration by means of the strapdown algorithm via the N samples will differ for error-related reasons from the fused solution, since the fused solution also experiences the error of the inertial measurement unit, but becomes sufficiently "desensitized" via the measurement update. The error is integrated and thereby made visible. Since the strapdown algorithm, and the states estimated thereby, is based on all 6 degrees of freedom of the inertial measurement unit and depends sufficiently strongly on the latter on each degree of freedom, any error of the inertial measurement unit directly leads to a deviation in the sample k, which deviation is expressed in one or more estimated states (pitch angle, roll angle, velocities in relation to the three spatial axes in the x, y and z directions).

The same also applies to the model assumptions of the measurement equation, which are sufficiently independent of the strapdown algorithm of the prediction: If an error occurs in an input variable of the measurement equation, the measurement equation differs for a duration of N samples from the prediction. The approach is therefore, in principle, also suitable for detecting errors of the measurement equation, but these errors are only visible for a certain time.

The following is noted: N defines the number of samples via which a look "into the past" takes place. For example, if 10 ms is assumed for a sample time and N is defined as 100, the algorithm builds the prediction from a time that is constantly 1 s in the past.

The following is noted: The solution is based on a Kalman filter for creating the measurement update. However, this solution also works with other state estimators, e.g., particles filters, i.e., any type of prediction-based algorithms.

The following is noted: In the above statements, the weighting of the states in the measurement update and in the prediction was not addressed. However, the algorithm is in particular ultimately based on the fact that the measurement variables are heavily weighted in the measurement update and thus dominate (a prediction is nevertheless required for complete representation of all estimated states, at least for the estimation of the pitch angle, of the roll angle and of the velocities in relation to the three spatial axes x, y and z, and that only one prediction takes place in the integration over N samples, i.e., the prediction is weighted at 100%, the measurement update is inactive (=0% weighted).

The invention claimed is:

1. A method for monitoring an egomotion state estimation of a motor vehicle, comprising the following steps:
   receiving, by a processor system that has access to a memory of the vehicle, inertial measurement data output by at least one inertial measurement unit (IMU) of the vehicle, the inertial measurement unit including at least one accelerometer and at least one gyroscopic sensor;
   storing, by the processor system, the inertial measurement data of the inertial measurement unit in the memory of the vehicle;
   receiving, by the processor system, velocity data of an absolute-velocity measurement sensor of at least one wheel sensor of the vehicle, the velocity data identifying a current velocity of the vehicle at a current time;
   determining, by the processor system and as a first current egomotion state of the vehicle at the current time, a first estimate that is obtained by propagating a first base state, which is an immediately preceding egomotion state, forward to the current time by fusing the inertial measurement data received at the current time with the identified current velocity;

determining, by the processor system and as a second current egomotion state of the vehicle at the same current time, a second estimate obtained by:

(a) retrieving from the memory (i) as a second base state, a prior egomotion state estimated as having been present at a defined past time point preceding the current time and (ii) a set of the stored inertial measurement data that was stored in the memory since the defined past time point; and (b) integrating the retrieved inertial measurement data forward in time from the second base state to the current time, thereby reconstructing the egomotion of the vehicle without using any determined velocity measurement that is used in determining the first current egomotion state, such that the determination of the second current egomotion state is independent of the absolute-velocity measurement sensor on which the determination of the first current egomotion state is dependent;

comparing, by the processor system, the first and second current egomotion states, each representing the vehicle's egomotion at the same current time but derived from different base states and data sets, by computing a difference between corresponding motion parameters of the two states;

evaluating, by the processor system, the difference against at least one threshold corresponding to a fault of at least one of the IMU and the velocity sensor; and controlling, by the processor system, a drive operation of the vehicle in response to the evaluation indicating that the difference exceeds the threshold.

2. The method according to claim 1, wherein the first current egomotion state is estimated using an estimation method including using a Kalman filter and/or a particle filter, which takes into account both movement dynamics of the vehicle and a correction using the current output data of the absolute-velocity measurement sensor.

3. The method according to claim 1, wherein the first current egomotion state of the vehicle and/or the second current egomotion state of the vehicle are each estimated using an egomotion dynamics equation including a strapdown algorithm.

4. The method according to claim 1, wherein output data of a further absolute-velocity measurement sensor including a further wheel sensor of the vehicle are received, wherein a further current velocity of the vehicle is determined based on the output data of the further absolute-velocity measurement sensor of the vehicle, wherein the first current egomotion state of the vehicle is estimated based on the further current velocity determination.

5. The method according to claim 1, further comprising the following steps:

receiving current output data of a further inertial measurement unit of the vehicle, the further inertial measurement unit including at least one further accelerometer and at least one further gyroscopic sensor;

storing the current output data of the further inertial measurement unit of the vehicle in the memory, in which older output data of the further inertial measurement unit are stored up to the defined past;

estimating a third current egomotion state of the vehicle based on a last estimated third egomotion state of the vehicle, the current output data of the further inertial measurement unit of the vehicle, and the current velocity determination;

estimating a fourth current egomotion state of the vehicle based on a third egomotion state that is in the defined past and older than the last estimated third egomotion state, based on the output data of the further inertial measurement unit that are stored in the memory and are within a time period from the defined past to the current time, and based on the current output data of the further inertial measurement unit; and monitoring the egomotion state estimation based on the estimated third current egomotion state and the estimated fourth current egomotion state.

6. The method according to claim 1, wherein, (i) based on the ascertained difference, an at least partially automated function including a driving function of the vehicle provided by a first vehicle system is limited, or (ii) based on the ascertained difference, a change is made to an alternative vehicle system which can provide the same function.

7. The method according to claim 1, further comprising the following steps:

receiving current output data of a further inertial measurement unit of the vehicle, the further inertial measurement unit including at least one further accelerometer and at least one further gyroscopic sensor;

storing the current output data of the further inertial measurement unit of the vehicle in the memory, in which older output data of the further inertial measurement unit are stored up to the defined past;

estimating a third current egomotion state of the vehicle based on a last estimated third egomotion state of the vehicle, the current output data of the further inertial measurement unit of the vehicle, and the current velocity determination;

estimating a fourth current egomotion state of the vehicle based on a third egomotion state that is in the defined past and older than the last estimated third egomotion state, based on the output data of the further inertial measurement unit that are stored in the memory and are within a time period from the defined past to the current time, and based on the current output data of the further inertial measurement unit; and monitoring the egomotion state estimation based on the estimated third current egomotion state and the estimated fourth current egomotion state;

wherein the monitoring includes a comparison of the estimated third current egomotion state to the estimated fourth current egomotion state, in order to ascertain a further difference between the estimated third current egomotion state and the estimated fourth current egomotion state, wherein, based on the ascertained differences, a functional capability of the inertial measurement unit, of the further inertial measurement unit, and of the absolute-velocity measurement sensor is ascertained.

8. A device configured to monitor an egomotion state estimation of a motor vehicle, the device comprising:

a memory of the vehicle; and a computer of the vehicle, wherein the computer has access to the memory and is configured to:

receive inertial measurement data output by at least one inertial measurement unit (IMU) of the vehicle, the inertial measurement unit including at least one accelerometer and at least one gyroscopic sensor;

store the inertial measurement data of the inertial measurement unit in the memory of the vehicle;

receive velocity data of an absolute-velocity measurement sensor of at least one wheel sensor of the vehicle, the velocity data identifying current velocity of the vehicle at a current time;

determine, as a first current egomotion state of the vehicle at the current time, a first estimate that is obtained by propagating a first base state, which is an immediately preceding egomotion state, forward to the current time by fusing the inertial measurement data received at the current time with the identified current velocity;

determine, as a second current egomotion state of the vehicle at the same current time, a second estimate obtained by:

(a) retrieving from the memory (i) as a second base state, a prior egomotion state estimated as having been present at a defined past time point preceding the current time and (ii) a set of the stored inertial measurement data that was stored in the memory since the defined past time point; and (b) integrating the retrieved inertial measurement data forward in time from the second base state to the current time, thereby reconstructing the egomotion of the vehicle without using any determined velocity measurement that is used in determining the first current egomotion state, such that the determination of the second current egomotion state is independent of the absolute-velocity measurement sensor on which the determination of the first current egomotion state is dependent;

compare the first and second current egomotion states, each representing the vehicle's egomotion at the same current time but derived from different base states and data sets, by computing a difference between corresponding motion parameters of the two states;

evaluate the difference against at least one threshold corresponding to a fault of at least one of the IMU and the velocity sensor; and control a drive operation of the vehicle in response to the evaluation indicating that the difference exceeds the threshold.

9. A non-transitory machine-readable storage medium on which is stored a computer program for monitoring an egomotion state estimation of a motor vehicle, the computer program being executable by a computer that has access to a memory of the vehicle and, when executed by the computer, causing the computer to perform the following steps:

receiving inertial measurement data output by at least one inertial measurement unit (IMU) of the vehicle, the inertial measurement unit including at least one accelerometer and at least one gyroscopic sensor;

storing the inertial measurement data of the inertial measurement unit in the memory of the vehicle;

receiving velocity data of an absolute-velocity measurement sensor of at least one wheel sensor of the vehicle, the velocity data identifying a current velocity of the vehicle at a current time;

determining, as a first current egomotion state of the vehicle at the current time, a first estimate that is obtained by propagating a first base state, which is an immediately preceding egomotion state, forward to the current time by fusing the inertial measurement data received at the current time with the identified current velocity;

determining, as a second current egomotion state of the vehicle at the same current time, a second estimate obtained by:

(a) retrieving from the memory (i) as a second base state, a prior egomotion state estimated as having been present at a defined past time point preceding the current time and (ii) a set of the stored inertial measurement data that was stored in the memory since the defined past time point; and (b) integrating the retrieved inertial measurement data forward in time from the second base state to the current time, thereby reconstructing the egomotion of the vehicle without using any determined velocity measurement that is used in determining the first current egomotion state, such that the determination of the second current egomotion state is independent of the absolute-velocity measurement sensor on which the determination of the first current egomotion state is dependent;

comparing the first and second current egomotion states, each representing the vehicle's egomotion at the same current time but derived from different base states and data sets, by computing a difference between corresponding motion parameters of the two states;

evaluating the difference against at least one threshold corresponding to a fault of at least one of the IMU and the velocity sensor; and controlling a drive operation of the vehicle in response to the evaluation indicating that the difference exceeds the threshold.

* * * * *